(12) United States Patent
Sekhri et al.

(10) Patent No.: US 10,862,706 B2
(45) Date of Patent: Dec. 8, 2020

(54) DETECTION OF NODE ISOLATION IN SUBTENDED ETHERNET RING TOPOLOGIES

(71) Applicant: Ciena Corporation, Hanover, MD (US)

(72) Inventors: Rahul Sekhri, Ambala (IN); Jitendra Kumar Sharma, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 22 days.

(21) Appl. No.: 16/379,863

(22) Filed: Apr. 10, 2019

(65) Prior Publication Data

US 2020/0274735 A1 Aug. 27, 2020

(30) Foreign Application Priority Data

Feb. 26, 2019 (IN) .............................. 201911007446

(51) Int. Cl.
| | | |
|---|---|---|
| *H04L 12/437* | (2006.01) | |
| *H04L 12/24* | (2006.01) | |
| *H04L 12/70* | (2013.01) | |

(52) U.S. Cl.
CPC ............ *H04L 12/437* (2013.01); *H04L 41/04* (2013.01); *H04L 41/0604* (2013.01); *H04L 41/0631* (2013.01); *H04L 2012/5612* (2013.01); *H04L 2012/5627* (2013.01)

(58) Field of Classification Search
CPC ... H04L 12/437; H04L 41/0631; H04L 41/04; H04L 41/0604
See application file for complete search history.

(56) References Cited

U.S. PATENT DOCUMENTS

| | | | | |
|---|---|---|---|---|
| 7,158,540 | B1 * | 1/2007 | Stiles | ...................... H04J 3/085 370/404 |
| 7,599,315 | B2 * | 10/2009 | Cornet | .................. H04L 12/437 370/258 |
| 8,355,348 | B1 * | 1/2013 | Miller | ................... H04L 12/462 370/256 |
| 8,737,198 | B1 * | 5/2014 | Holness | ................ H04L 12/437 370/222 |
| 2002/0145782 | A1 * | 10/2002 | Strasser | .............. H04J 14/0286 398/83 |

(Continued)

OTHER PUBLICATIONS

D. Katz et al., Bidirectional Forwarding Detection (BFD), Internet Engineering Task Force (IETF), Category: Standards Track, Juniper Networks, ISSN: 2070-1721, Jun. 2010, pp. 1-49.

(Continued)

*Primary Examiner* — Min Jung
(74) *Attorney, Agent, or Firm* — Clements Bernard Walker; Lawrence A. Baratta, Jr.; Christopher L. Bernard (57) ABSTRACT

Systems and methods for node isolation detection include, in one or more hub nodes in an Ethernet network having a first ring and a second ring that subtends off the one or more hub nodes on the first ring, operating a first plurality of Operations, Administration, and Maintenance (OAM) sessions with each node in the second ring in a first direction around the second ring; operating a second plurality of OAM sessions with each node in the second ring in a second direction around the second ring; and correlating and detecting faults and node isolation in the second ring based on the first plurality of OAM sessions and the second plurality of OAM sessions.

20 Claims, 8 Drawing Sheets

(56) References Cited

U.S. PATENT DOCUMENTS

| | | | |
|---|---|---|---|
| 2003/0117946 A1* | 6/2003 | Fontana | H04L 12/437 |
| | | | 370/216 |
| 2014/0064063 A1* | 3/2014 | Holness | H04L 69/40 |
| | | | 370/225 |

OTHER PUBLICATIONS

D. Katz et al., Bidirectional Forwarding Detection (BFD) for IPv4 and IPv6 (Single Hop), Internet Engineering Task Force (IETF), Category: Standards Track, Juniper Networks, ISSN: 2070-1721, Jun. 2010, pp. 1-7.

R. Aggarwal et al., Bidirectional Forwarding Detection (BFD) for MPLS Label Switched Paths (LSPs), Internet Engineering Task Force (IETF), Category: Standards Track, ISSN: 2070-1721, Cisco Systems, Inc., Jun. 2010, pp. 1-12.

T. Nadeau et al., Bidirectional Forwarding Detection (BFD) for the Pseudowire Virtual Circuit Connectivity Verification (VCCV), Internet Engineering Task Force (IETF), Category: Standards Track, ISSN: 2070-1721, Cisco Systems, Inc., Jun. 2010, pp. 1-14.

International Telecommunication Union, Operation, administration and maintenance (OAM) functions and mechanisms for Ethernet-based networks, ITU-T, G.8013/Y.1731, Telecommunication Standardization Sector of ITU, Aug. 2015, pp. 1-102.

N. Finn, IEEE 802 Connectivity Fault Management / ITU-T Ethernet OAM Overview, IETF91 Honolulu CFM / Ether OAM Overview, Nov. 9-14, 2014, pp. 1-17.

* cited by examiner

DETECTION OF NODE ISOLATION IN SUBTENDED ETHERNET RING TOPOLOGIES

FIELD OF THE DISCLOSURE

The present disclosure generally relates to networking systems and methods. More particularly, the present disclosure relates to systems and methods for detection of node isolation in subtended Ethernet ring topologies.

BACKGROUND OF THE DISCLOSURE

Ethernet networks based upon multi-ring topologies are growing rapidly. Access rings can be deployed towards the edge as subtended rings off of other rings either designed as single home or dual-home topologies. Deploying a multi-ring topology provides diversity and improves availability. However, dual fiber cuts in subtending rings can cause isolation of node(s) in the network. Fiber cuts are usually reported by link down events to the end user. Two or more simultaneous links going down in a specific subtended ring is a critical event that could result into node isolation. Also, if there are any other in-between devices, for example, a fault in Layer 1 Time Division Multiplexing (TDM) network in-between two Ethernet ring nodes does not show up as a link down event, but multiple faults can isolate the part of ring and become a silent failure. Due to multiple link faults/defects showing up in larger networks, it is a cumbersome task to identify the isolation of nodes/outages due to multiple faults occurring simultaneously.

Disadvantageously, conventional approaches for detecting link failures do not correlate multiple faults happening in the ring, which can cause node(s) in a subtended ring to become completely isolated. If an administrator comes to know of this situation early, then corrective steps can be taken to reroute the traffic around the failed ring. Accordingly, there is a need for detection of node isolation in subtended Ethernet ring topologies.

BRIEF SUMMARY OF THE DISCLOSURE

In an embodiment, a network element in an Ethernet network includes a plurality of ports having two ports in a first ring and at least one port in a second ring that subtends off the first ring; and a switching fabric interconnecting the plurality of ports, wherein the at least one port operates a first plurality of Operations, Administration, and Maintenance (OAM) sessions with each node in the second ring in a first direction around the second ring, wherein a second plurality of OAM sessions is operated with each node in the second ring in an opposite direction around the second ring from the first direction, and wherein faults and node isolation are correlated and detected based on the first plurality of OAM sessions and the second plurality of OAM sessions. The network element can be in a single-homed configuration with the at least one port including a first port that operates the first plurality of OAM sessions and a second port that operates the second plurality of OAM sessions.

The network element can be in a dual-homed configuration with the at least one port including a first port that operates the first plurality of OAM sessions and a second network element connected to the first network element over the first ring that operates the second plurality of OAM sessions. A communication protocol can be implemented between the network element and the second network element over the first ring for the faults and node isolation. The communication protocol can include event notifications with an identifier for the second ring and information related to the node isolation. The faults and node isolation can be correlated and detected, for more than one fault in the second ring, through a determination of a number of nodes in the second ring that are isolated; and a determination of which nodes in the second ring are isolated. The number of nodes in the second ring that are isolated equals a total number of nodes in the second ring minus a total number of the first plurality of OAM sessions and the second plurality of OAM sessions that remain operational. The faults and node isolation can be correlated and detected, for one fault in the second ring, through a determination of a location of the fault based on where each of the first plurality of OAM sessions and the second plurality of OAM sessions stop. The first plurality of OAM sessions and the second plurality of OAM sessions can utilize one of Continuity Check Messages (CCMs) and Bidirectional Forwarding Detection (BFD) messages.

In a further embodiment, a method of node isolation detection includes, in one or more hub nodes in an Ethernet network having a first ring and a second ring that subtends off the one or more hub nodes on the first ring, operating a first plurality of Operations, Administration, and Maintenance (OAM) sessions with each node in the second ring in a first direction around the second ring; operating a second plurality of OAM sessions with each node in the second ring in a second direction around the second ring; and correlating and detecting faults and node isolation in the second ring based on the first plurality of OAM sessions and the second plurality of OAM sessions. The correlating and detecting can include, for more than one fault in the second ring, determining a number of nodes in the second ring that are isolated; and determining which nodes in the second ring are isolated. The number of nodes in the second ring that are isolated equals a total number of nodes in the second ring minus a total number of the first plurality of OAM sessions and the second plurality of OAM sessions that remain operational.

The correlating and detecting can include, for one fault in the second ring, determining a location of the fault based on where each of the first plurality of OAM sessions and the second plurality of OAM sessions stop. The one or more hub nodes on the first ring can be two hub nodes, and the method can further include implementing a communication protocol between the two hub nodes over the first ring for the correlating and detecting faults and node isolation. The communication protocol can include event notifications with an identifier for the second ring and information related to the node isolation. The first plurality of OAM sessions and the second plurality of OAM sessions can utilize one of Continuity Check Messages (CCMs) and Bidirectional Forwarding Detection (BFD) messages.

In a further embodiment, a network management system includes a network interface communicatively coupled to one or more network elements in an Ethernet network having a first ring and a second ring that subtends off one or more hub nodes on the first ring; a processor; and memory storing instructions that, when executed, cause the processor to obtain data, via the network interface, from the one or more hub nodes related to a first plurality of Operations, Administration, and Maintenance (OAM) sessions that operate from the one or more hub nodes to each node in the second ring in a first direction around the second ring, obtain data, via the network interface, from the one or more hub nodes related to a second plurality of OAM sessions that operate from the one or more hub nodes to each node in the second ring in a second direction around the second ring, and correlate and detect faults and node isolation in the second ring based on the first plurality of OAM sessions and the second plurality of OAM sessions.

The memory storing instructions that, when executed, can further cause the processor to, for more than one fault in the second ring, determine a number of nodes in the second ring that are isolated; and determine which nodes in the second ring are isolated. The number of nodes in the second ring that are isolated equals a total number of nodes in the second ring minus a total number of the first plurality of OAM sessions and the second plurality of OAM sessions that remain operational. The memory storing instructions that, when executed, can further cause the processor to, for one fault in the second ring, determine a location of the fault based on where each of the first plurality of OAM sessions and the second plurality of OAM sessions stop.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is a block diagram of a server which may be used for a Network Management System (NMS) or the like.

DETAILED DESCRIPTION OF THE DISCLOSURE

In various embodiments, the present disclosure relates to systems and methods for detection of node isolation in subtended Ethernet ring topologies. Specifically, the systems and methods provide a capability to quickly detect node isolation due to multiple failures. Further, the systems and methods automatically correlate multiple faults causing node(s) isolation, without the need for manual intervention. Advantageously, the systems and methods reduce network outage time drastically, allowing network operators to fulfill Service Level Agreements (SLAs). The systems and methods efficiently detect multiple faults and correlate them for identifying isolated nodes. Also, the systems and methods are applicable to Layer 2, Multiprotocol Label Switching (MPLS), Layer 3, etc. with corresponding Connectivity Fault Management (CFM) techniques. CFM is defined in, for example, IEEE 802.1ag, Virtual Bridged Local Area Networks, Amendment 5: Connectivity Fault Management (2007) and ITU-T G.8013/Y.1731 ($^{11}/_{13}$) "OAM functions and mechanisms for Ethernet-based networks," the contents of which are incorporated by reference.

Of note, the foregoing description utilizes Ethernet OAM, namely Continuity Check Messages (CCMs) which are "heartbeat" messages used to determine connectivity. However, the systems and methods described herein contemplate other techniques. For example, Label Switched Path (LSP) Bidirectional Forwarding Detection (BFD) or Internet Protocol (IP) Multi-hop BFD session can also be used for fault detection. BFD is defined in, for example, IETF RFC 5880, "Bidirectional Forwarding Detection", D. Katz, D. Ward (June 2010); IETF RFC 5881, "BFD for IPv4 and IPv6 (Single Hop)", D. Katz, D. Ward (June 2010); IETF RFC 5884, "Bidirectional Forwarding Detection (BFD) for MPLS Label Switched Paths (LSPs)," R. Aggarwal, et al. (June 2010); and IETF RFC 5885, "Bidirectional Forwarding Detection (BFD) for the Pseudowire Virtual Circuit Connectivity Verification (VCCV)," T. Nadeau et al. (June 2010), the contents of which are incorporated by reference.

Ethernet Network

Figure 1:
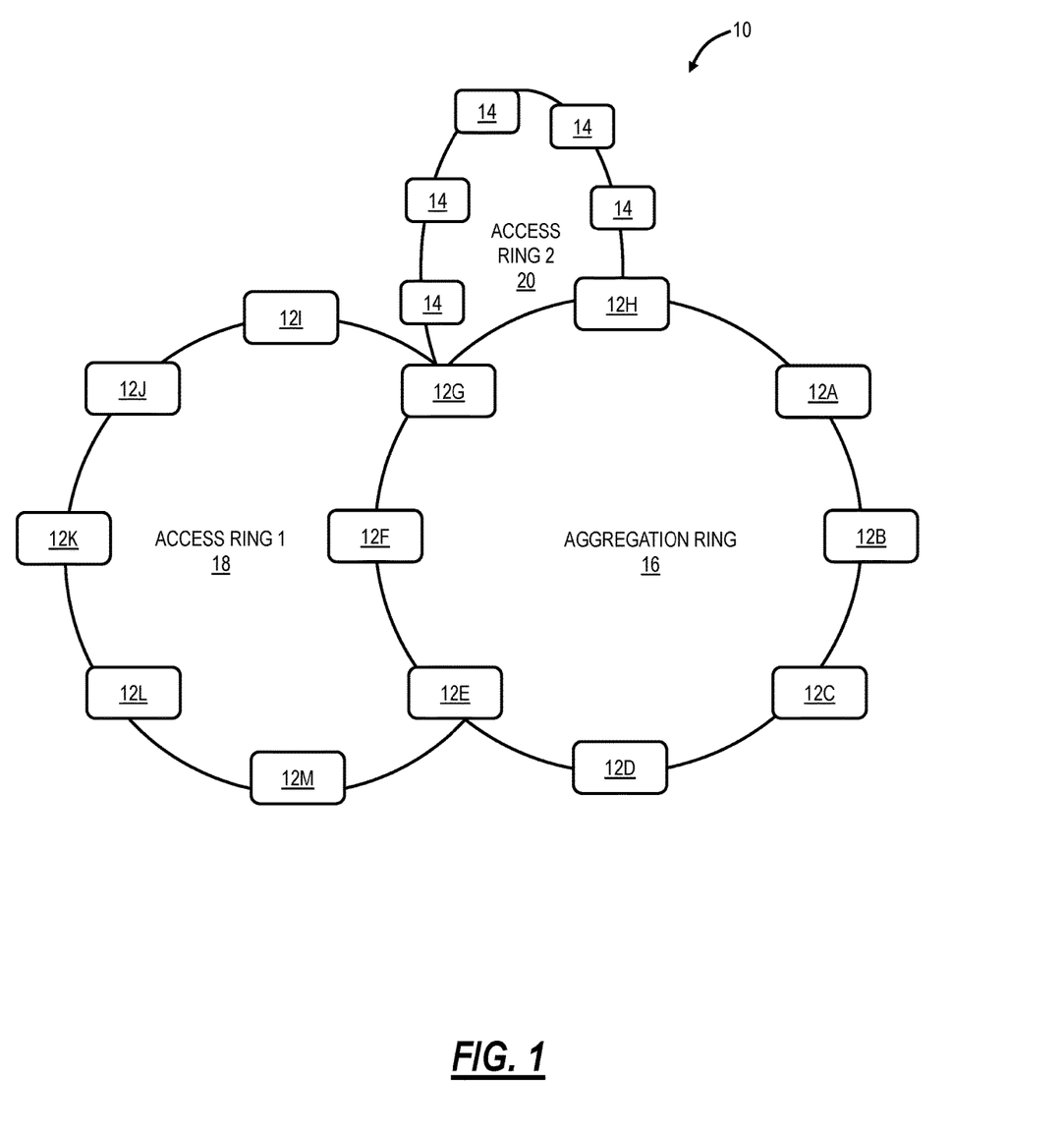
FIG. 1 is a network diagram of an Ethernet network with multiple network elements in a multi-ring topology.

FIG. 1 is a network diagram of an Ethernet network 10 with multiple network elements 12, 14 in a multi-ring topology. The network elements 12 include network elements 12A-12M configured in an aggregation ring 16 and an access ring 1 18. The aggregation ring 16 physically forms a ring topology with the network elements 12A-12H. The access ring 1 18 subtends off the aggregation ring 16 and includes the network elements 12E, 12G, 12I-12M. The network elements 14 are part of an access ring 2 20 which also subtends off the aggregation ring 16. An example implementation of the network elements 12, 14 is illustrated in FIGS. 6 and 7.

The access rings 18, 20 are deployed towards the edge as subtended rings either designed as a single home or dual-home topologies. In the example of FIG. 1, the access rings 18, 20 are dual-horned. Deploying a multi-ring topology provides diversity and improves availability whereas dual fiber cuts in subtending rings can cause isolation of node(s) in the network. However, fiber cuts are usually reported by link down events to the end user. Whereas two or more simultaneous links going down in a specific subtended ring are a critical event, as they result into node isolation. Also, if there are any other media in-between devices, for example, a fault in Time Division Networking (TDM) networks in-between two Ethernet ring nodes does not show up as link down events on the Ethernet nodes, but multiple faults can isolate the part of the ring and become a silent failure.

Disadvantageously, with multiple link faults/defects showing up on a Network Management System (NMS) in larger networks, it is a very cumbersome task to identify the isolation of nodes/outages due to multiple faults occurring simultaneously. Additionally, the user/NMS needs intelligence to correlate multiple faults to come up with the cause of the service outages or ring isolation.

Ethernet OAM

The systems and methods proposed herein contemplate implementation and operation on Ethernet networks such as those compliant to IEEE 802.1ag-2007, G.8013/Y.1731, and/or Metro Ethernet Forum (MEF) specifications. Of note, IEEE 802.1ag-2007 and G.8013/Y.1731 both relate to and define CFM for Ethernet Operations, Administration, and Maintenance (OAM). Various terminology utilized herein, such as Maintenance End Point (MEP), Maintenance Intermediate Point (MIP), Continuity Check Message (CCM), Protocol Data Unit (PDU), etc. is common to each of IEEE 802.1ag-2007, G.8013/Y.1731, MEF, etc. IEEE 802.1ag- 2007 utilizes the term Maintenance Association (MA) whereas G.8013/Y.1731 utilizes Maintenance Entity Group (MEG) for the same construct. Fundamental to CFM is the concept of a MEG or MA, which is the identified network transport construct spanning the various network nodes underlying a given service or set of services. CFM relies on well-defined messages exchanged between the network elements, specifically and in particular each MEP that provides origination and termination of the service transport path(s) for an MA.

Each MEP is a point at the edge of an MD which defines the boundary of the domain, and each MEP is configured to send and receive CFM frames. The MD is a management space on a network, typically owned and operated by a single entity. MDs are configured with Names and Levels, and a hierarchical relationship exists between domains based on levels. An MA defines a set of MEPs; all of which are configured with the same MAID (Maintenance Association Identifier) and MD Level, each of which is configured with a MEPID unique within that MAID and MD Level, and all of which are configured with the complete list of MEPIDs. MIPs are points internal to a domain, not at the boundary. The MIPs are passive points, responding only when triggered, such as by CFM traceroute and loopback messages. A DOWN MEP receives CFM frames or Protocol Data Units (PDUs) from the network and transmits CFM frames or PDUs towards the network. A UP MEP receives CFM frames or PDUs from a switch's bridging function and sends CFM PDUs towards the bridging function.

Node Isolation Detection

Figure 2:
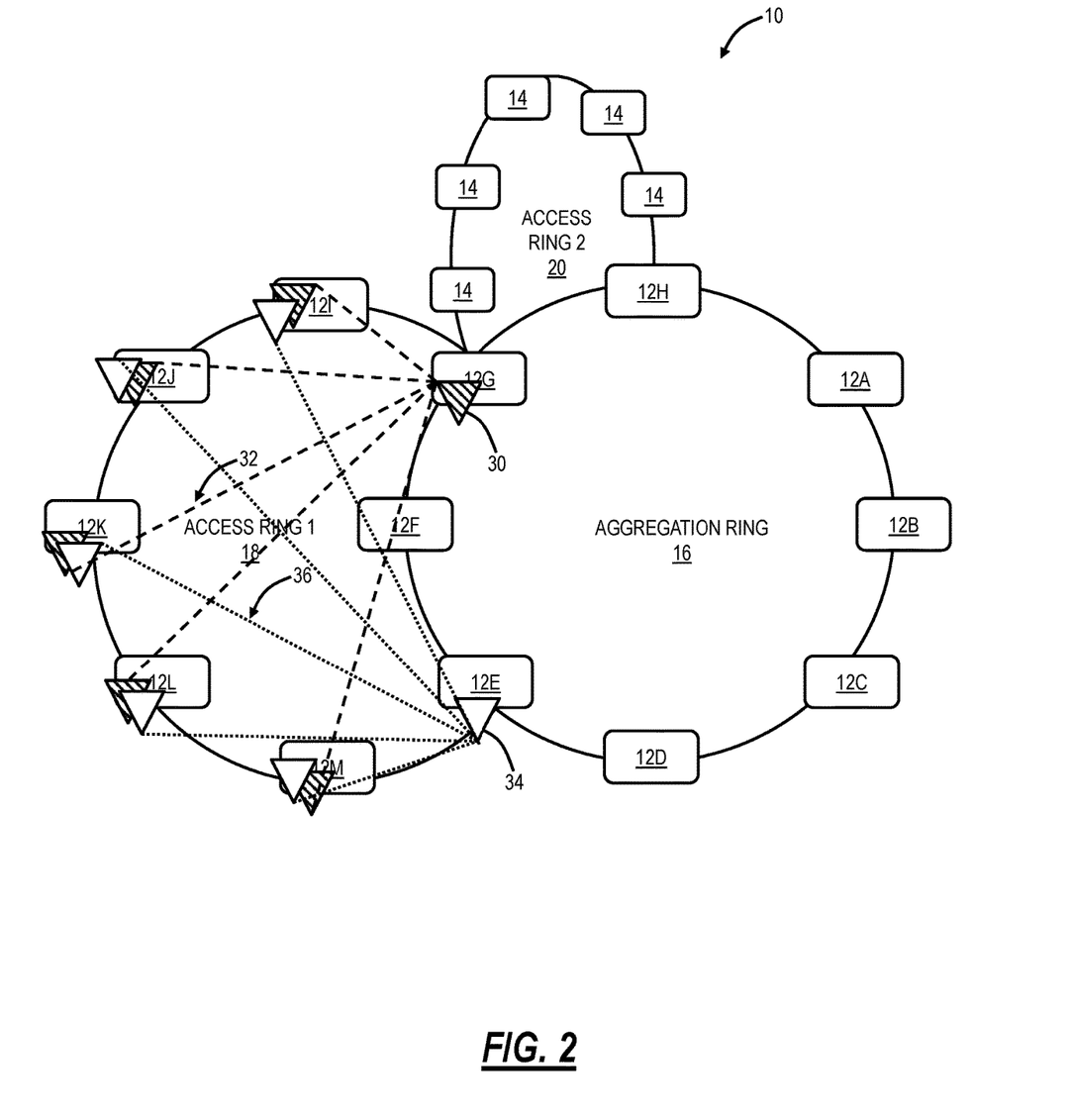
FIG. 2 is a network diagram of the Ethernet network with Operations, Administration, and Maintenance (OAM) sessions configured on the nodes to detect node isolation in the access ring 1.

FIG. 2 is a network diagram of the Ethernet network 10 with OAM sessions configured on the nodes 12E, 12G to detect node isolation in the access ring 1 18. The systems and methods described herein utilize CCMs or BFDs to detect node isolation in subtending rings. In the example of FIG. 2, the systems and methods are illustrated with respect to the access ring 1 18. Every node, i.e., the network elements 12E, 12G, 12I-12M, in the subtended ring, i.e., the access ring 1 18, are configured with a continuity check mechanism such as a CFM/BFD session to each of the two hub locations, i.e., the network elements 12E, 12G, which are terminating points for this subtended ring.

In FIG. 2, the network element 12G has an MEP 30 configured with OAM sessions 32 with each of the network elements 12I, 12J, 12K, 12L, and 12M. Similarly, the network element 12E has MEP 34 configured with OAM sessions 36 with each of the network elements 12I, 12J, 12K, 12L, and 12M. The OAM sessions 32, 36 are configured with an MEP at the network element 12G, 12E, respectively, and an MEP at a corresponding one of the network elements 12I, 12J, 12K, 12L, and 12M. The OAM sessions 32, 36 include the periodic exchange of continuity checks such as CCMs, BFDs, etc. In an embodiment, the OAM sessions 32, 36 are solely used for the node isolation detection in the access ring 1 18, with no associated user services.

Note, the OAM sessions 32, 36 are each in a separate direction around the access ring 1 18. For example, the OAM sessions 32 are counterclockwise (logically), e.g., a first direction, and the OAM sessions 36 are clockwise (logically), e.g., a second direction that is different from the first direction. Further, the example of FIG. 2 illustrates two hub nodes, the network elements 12E, 12G. In another embodiment, there can be a single hub node where the access ring 1 18 is single-homed (vs. dual-homed in the example of FIG. 2). In this case, the OAM sessions 32, 36 originate from the same hub node, but still have the direction difference in the access ring 1 18.

FIG. 2 illustrates the OAM sessions 32, 36 for node isolation where there are no faults. When there is no failure in the subtended ring, i.e., the access ring 1 18, the total number of OAM sessions 32, 36 that operation cumulatively on the pair of hub nodes (the network elements 12E, 12G) is equal to 2× the number of ring nodes in the subtended ring, i.e., the access ring 1 18. As there are five ring nodes in access ring 1 18, there are 10 OAM sessions 32, 36 with five OAM sessions 32 on the network element 12G and five OAM sessions 36 on the network element 12E.

Figure 3:
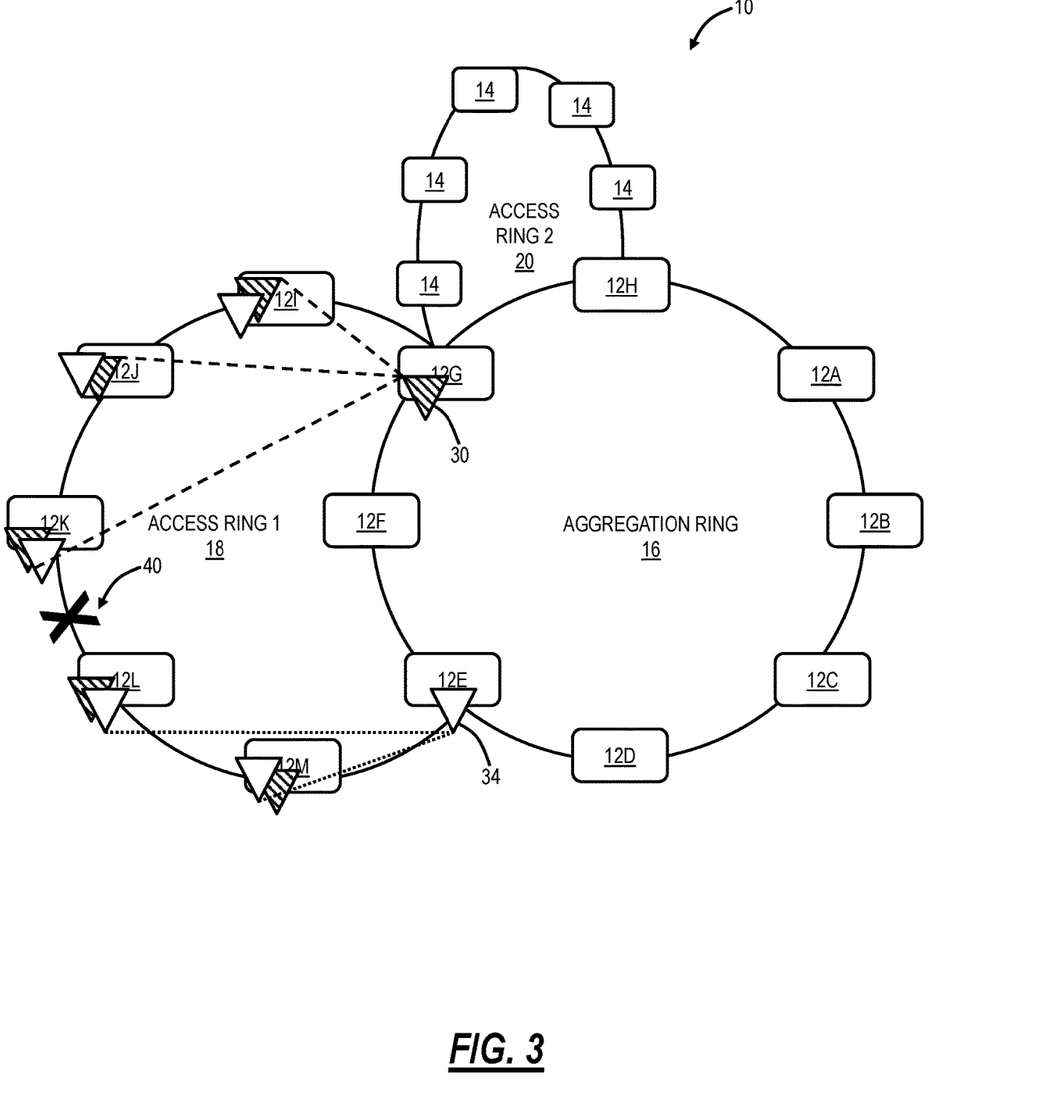
FIG. 3 is a network diagram of the Ethernet network with OAM sessions configured on the nodes to detect node isolation in the access ring 1 and with a single failure.

FIG. 3 is a network diagram of the Ethernet network 10 with OAM sessions configured on the nodes 12E, 12G to detect node isolation in the access ring 1 18 and with a single failure 40. As shown in FIG. 3, with a single fiber cut, i.e., the failure 40, in the subtending ring, i.e., the access ring 1 18, the total number of OAM sessions 32, 36 cumulatively operating on the pair of hub nodes (the network elements 12E, 12G) is equal to the number of ring nodes, e.g., five total OAM sessions 32, 36. In FIG. 3, there is still no node isolation, as there is an alternate path available around the access ring 1 18. Of note, the OAM sessions 32, 36 can be used to quickly isolation the failure 40 location, i.e., between the network elements 12K, 12L, based on the remaining OAM sessions 32, 36.

Figure 4:
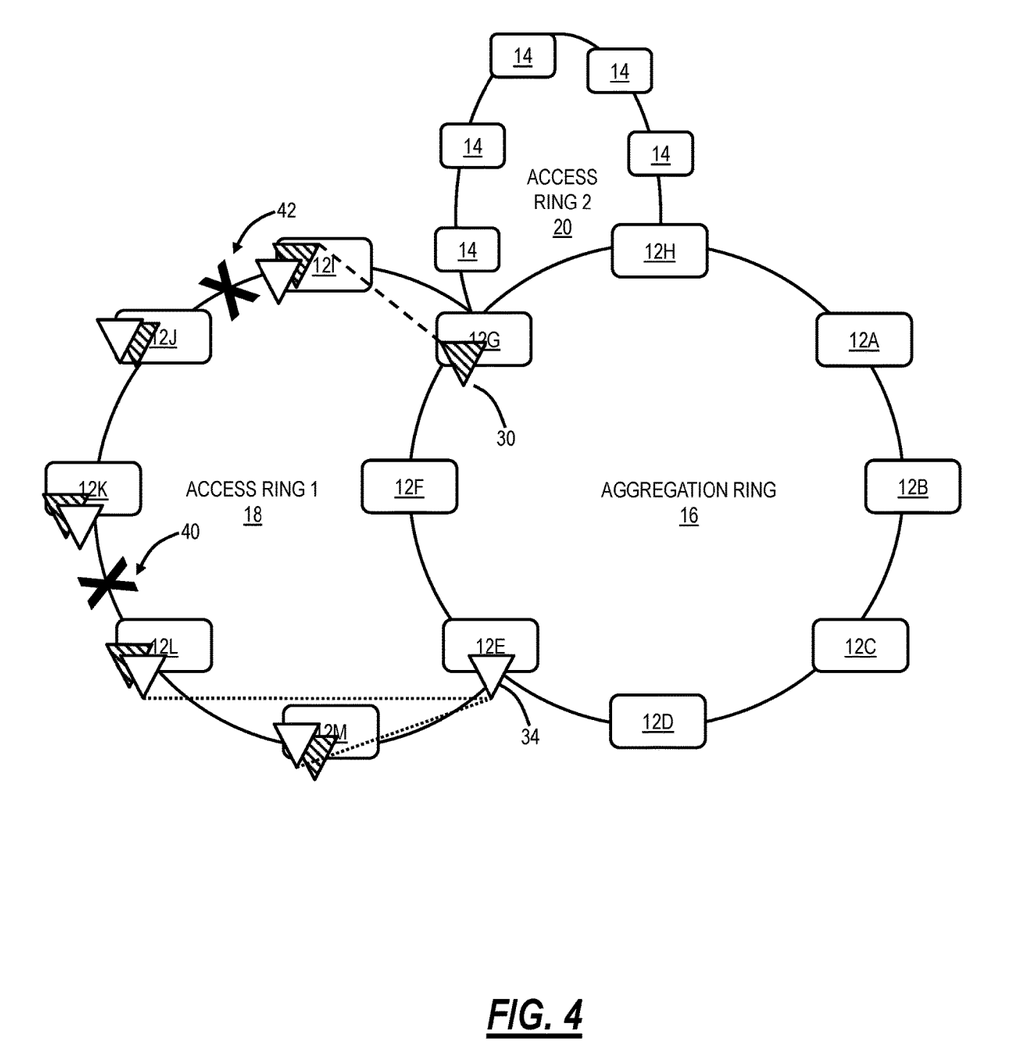
FIG. 4 is a network diagram of the Ethernet network with OAM sessions configured on the nodes to detect node isolation in the access ring 1 and with multiple failures.

FIG. 4 is a network diagram of the Ethernet network 10 with OAM sessions configured on the nodes 12E, 12G to detect node isolation in the access ring 1 18 and with multiple failures 40, 42. FIG. 4 continues from FIG. 3 with a second failure 42. Now with successive fiber cuts in the access ring 1 18, the number of nodes isolated due to faults in the access ring 1 18 can be deduced by looking at the total number of OAM sessions 32, 36 cumulatively operating on the pair of hub nodes (the network elements 12E, 12G). The number of nodes isolated=number of ring nodes—total number of OAM sessions up. In FIG. 4, with the failures 40, 42, there is one OAM session up or operating on the network element 12G and two OAM sessions up or operating on the network element 12E. Thus, with three OAM sessions up, there are two network elements in the access ring 1 18 isolated, namely nodes isolated=5 (number of ring nodes)−3 (number of OAM sessions up). Further, the data from the OAM sessions can be used to determine the identity of the isolated network elements 12J, 12K.

The hub locations, the network elements 12E, 12G, are configured to perform detection and correlation based on the OAM sessions. In an embodiment, the hub locations can communicate with one another, i.e., based on the connectivity via the aggregation ring 16, not via the access ring 1 18 due to the failures 40, 42. The hub locations can communicate about the number of operationally UP OAM sessions to each other, and one of them can generate trap/alarm/event notification about the number of nodes getting isolated in the respective ring.

An event notification from one of the hub locations can include:

| Ring ID | User configurable string |
|---|---|
| Number of nodes isolated | Integer |
| Suspect bit | True/False |

The interval which is the frequency the OAM sessions transmit and receive messages can be configured suitably to match hardware and software OAM packet processing capabilities and the urgency to detect node(s) isolation.

When there is a hierarchy/cascading of subtended rings in the network, each ring's hub nodes can run an Inter-Chassis Link (ICL) and corresponding detection process independently. A pair of hub nodes can have more than one subtended rings hanging on to them. Hence the "Ring-ID" identifier is needed on each OAM session to correlate events in that ring. OAM session information relating to different subtended rings on the same pair of hub nodes is maintained separately. This ensures that if one of the hub nodes is part of another subtended ring hub node pair, then the OAM session can be successfully isolated based on the "Ring-ID" identifier. Node(s) isolation events shall be in addition to the CFM/BFD events that are already present in the network.

The ICL, protocol can be used to convey i) the total no, of OAM sessions configured to monitor node(s) isolation and ii) the total number of UP OAM sessions on each hub node. One of the hub node pair can be designated as a master and responsible for generating node isolation events, such as to a Network Management System (NMS).

There can be a keep-alive mechanism running between two hub nodes to determine the availability of the peer hub node, e.g., another OAM session between the two hub nodes, the network elements 12E, 12G. This additional OAM session can be configured on the aggregation ring 16 such that its availability is independent of the access ring 1 18. If a master hub node goes down, the slave node will become master and will be responsible for sending node isolation events.

Information over the ICL link between hub nodes can be sent only when there is a change in no. of up/down sessions. With respect to a split brain situation where the hub nodes lose communication and each tries to become a master, with each notification by any of the network elements, where the communication is broken between the network elements, a "suspect bit" shall be set in the Event Notification, so that Administrator can still have the information, but it cannot be fully trusted.

In the case of a single-homed subtended ring case, there is only one hub network element, and there would be no need to have ICL running for coordination.

Advantageously, the node isolation detection approach can apply to any service provider network with subtending rings. This solves the problem where there is no mechanism for fast detection of dual failures in the ring. Currently, an operator has to manually correlate multiple faults in the whole network for this detection, which is very cumbersome and inefficient leading to extended service outages. In large service provider networks, there is a high possibility of multiple failures 40, 42.

Node Isolation Detection Process

Figure 5:
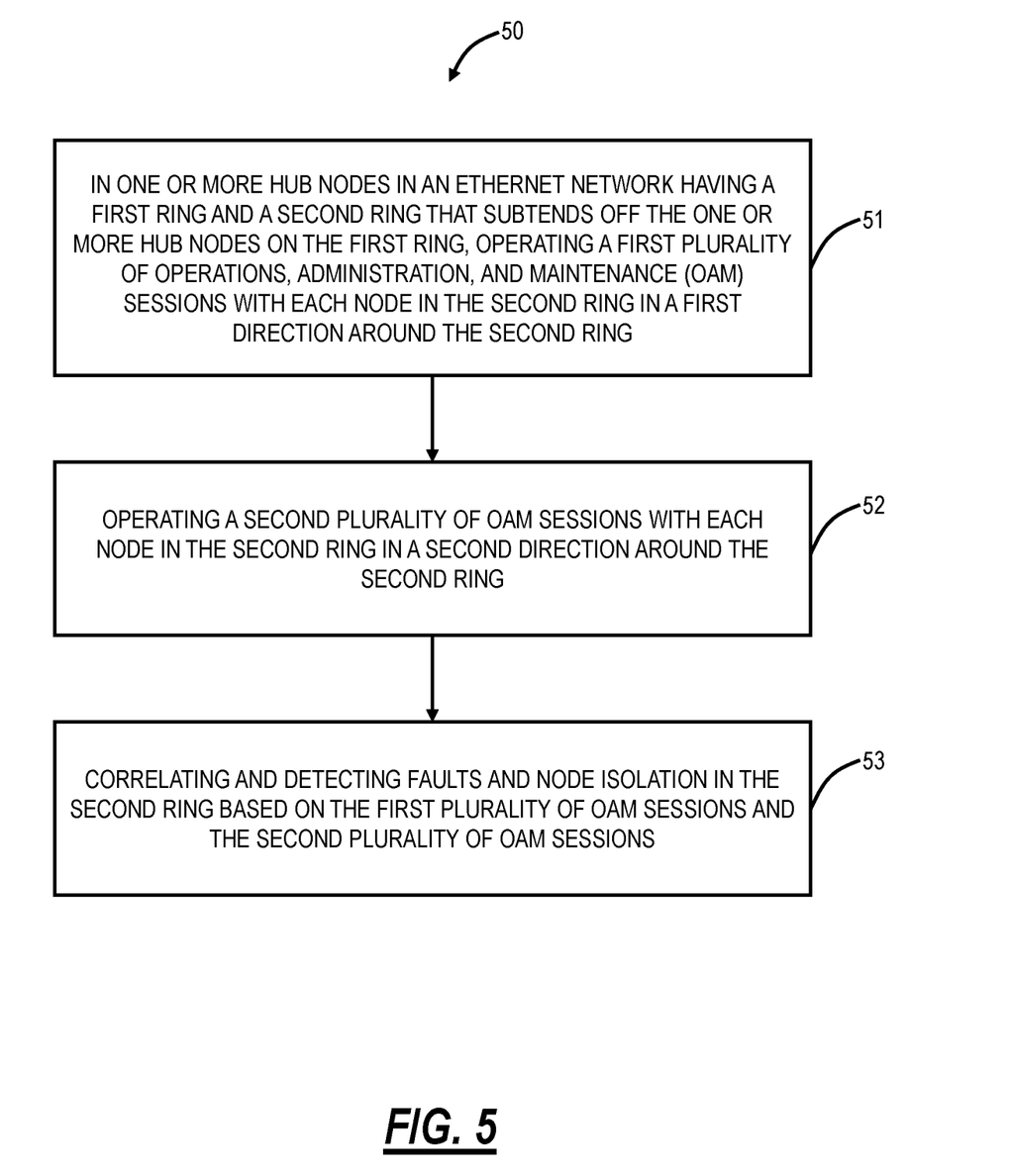
FIG. 5 is a block diagram of a node isolation detection process.

FIG. 5 is a block diagram of a node isolation detection process 50. The node isolation detection process 50 includes, in one or more hub nodes in an Ethernet network having a first ring and a second ring that subtends off the one or more hub nodes on the first ring, operating a first plurality of Operations, Administration, and Maintenance (OAM) sessions with each node in the second ring in a first direction around the second ring (step 51); operating a second plurality of OAM sessions with each node in the second ring in a second direction around the second ring (step 52); and correlating and detecting faults and node isolation in the second ring based on the first plurality of OAM sessions and the second plurality of OAM sessions (step 53).

The correlating and detecting can include, for more than one fault in the second ring, determining a number of nodes in the second ring that are isolated; and determining which nodes in the second ring are isolated. The number of nodes in the second ring that are isolated equals a total number of nodes in the second ring minus a total number of the first plurality of OAM sessions and the second plurality of OAM sessions that remain operational.

The correlating and detecting can include, for one fault in the second ring, determining a location of the fault based on where each of the first plurality of OAM sessions and the second plurality of OAM sessions stop. The one or more hub nodes on the first ring can be two hub nodes, and the node isolation detection process 50 can further include implementing a communication protocol between the two hub nodes over the first ring for the correlating and detecting faults and node isolation. The communication protocol can include event notifications with an identifier for the second ring and information related to the node isolation. The first plurality of OAM sessions and the second plurality of OAM sessions can utilize one of Continuity Check Messages (CCMs) and Bidirectional Forwarding Detection (BFD) messages.

The correlating and detecting can be at one of the hub nodes and/or at an NMS. If this correlation is to be performed at the NMS, an operator needs to specify number of OAM sessions such as on an NMS tool.

Node

Figure 6:
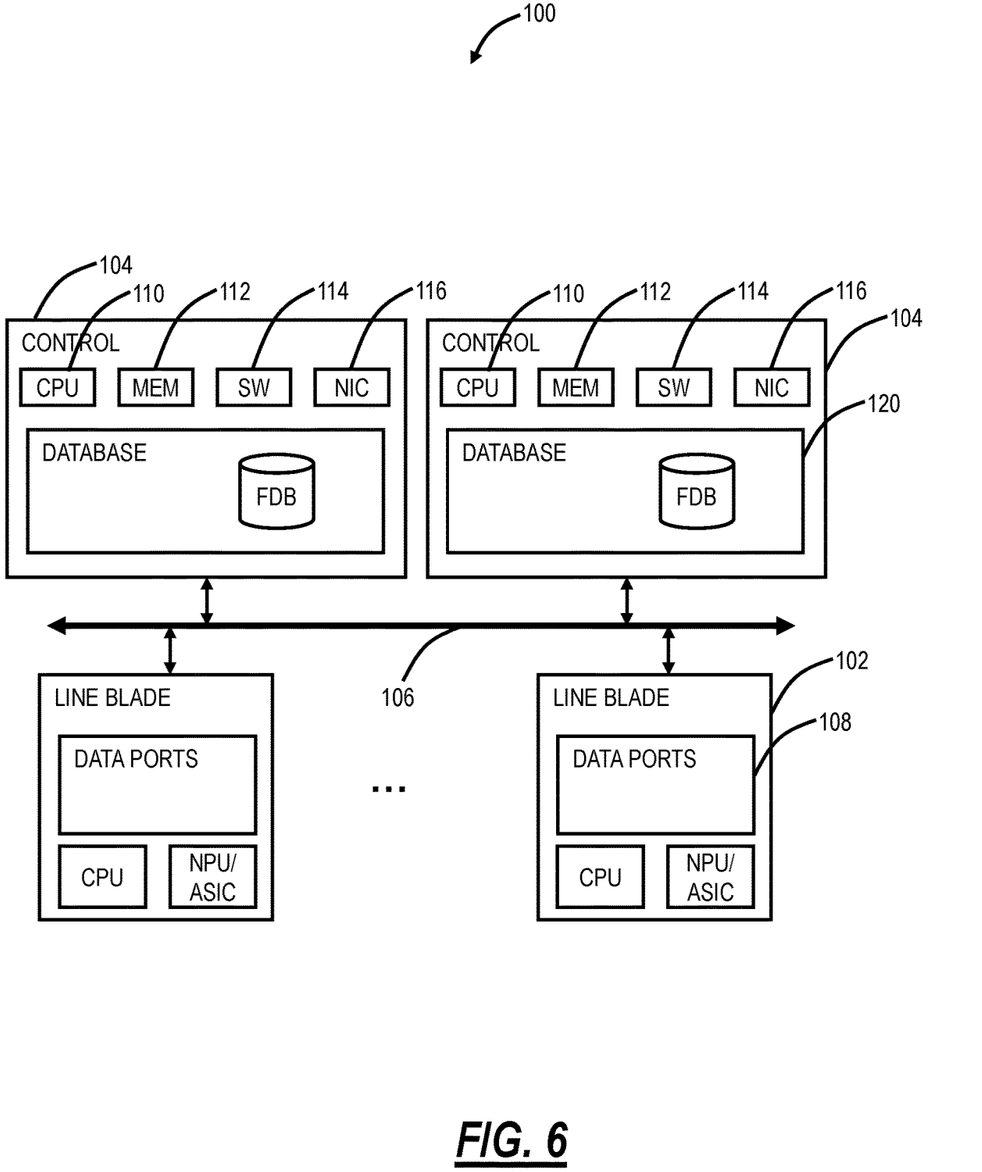
FIG. 6 is a block diagram of an implementation of a node, such as for the network elements in FIGS. 1-4.

FIG. 6 is a block diagram of an implementation of a node 100, such as for the network elements 12. In this embodiment, the node 100 is an Ethernet network switch, but those of ordinary skill in the art will recognize the systems and methods described herein can operate with other types of network elements and other implementations. In this embodiment, the node 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 100. Each of the blades 102, 104 can include numerous electronic devices and/or optical devices mounted on a circuit board along with various interconnects including interfaces to the chassis, shelf, etc.

Two example blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB) that may be populated as described herein (e.g., via the user triggered approach or the asynchronous approach). In this embodiment, the node 100 includes two control blades 104 which may operate in a redundant or protected configuration such as 1:1, 1+1, etc.

Figure 7:
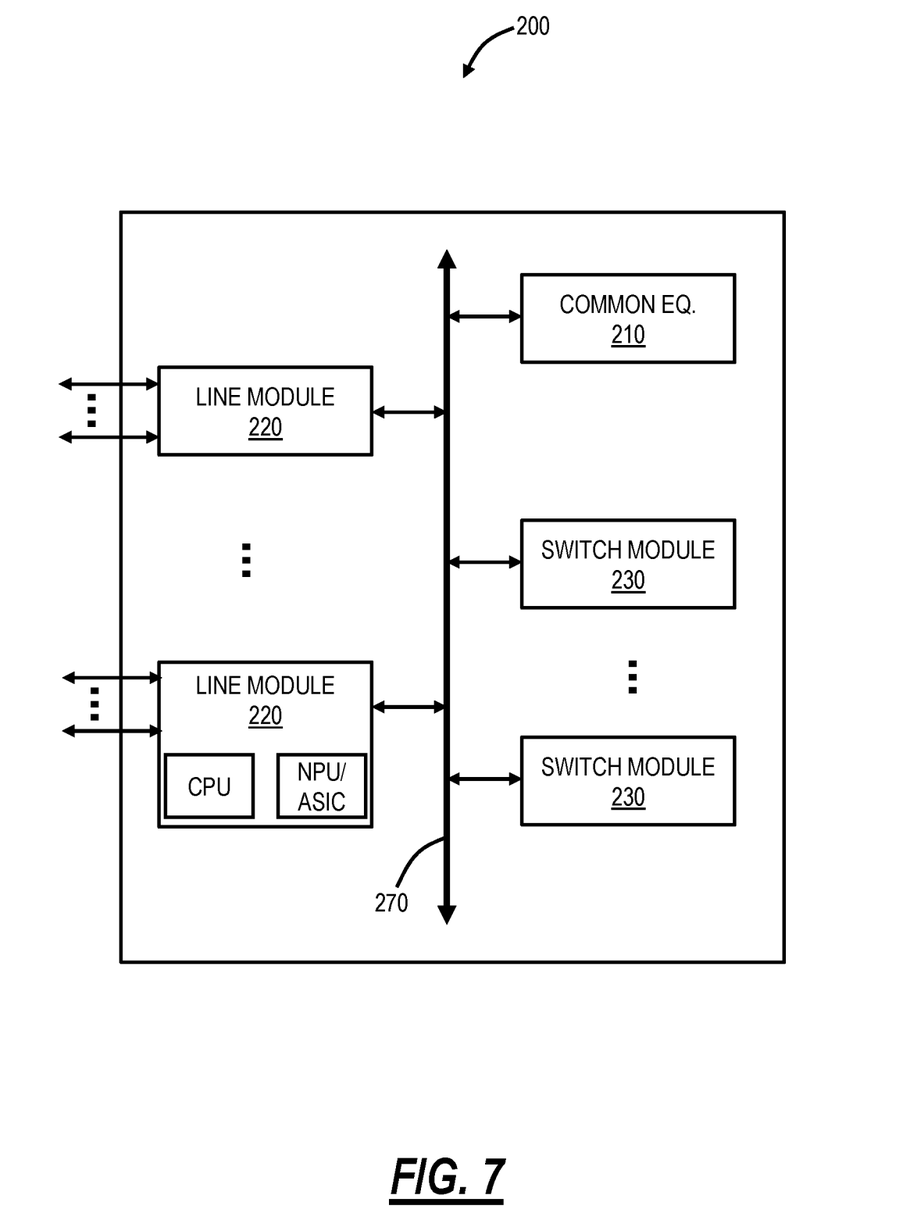
FIG. 7 is a block diagram of another implementation of a node, such as for the network elements in FIGS. 1-4.

FIG. 7 is a block diagram of another implementation of a node 200. For example, the node 100 can be a dedicated switch whereas the node 200 can be a multiservice platform. In an embodiment, the node 200 can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another embodiment, the node 200 can be any of an add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of packets, channels, timeslots, tributary units, wavelengths, etc.

In an embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), an element management system (EMS), or the like. The node 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the node 200. In an embodiment, the line modules 220 can form ingress and egress switches with the switch modules 230 as center stage switches for a three-stage switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short reach interfaces, and the like, and can connect to other line modules 220 on remote network elements, end clients, routers, switches, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity such as Optical Channel Data Unit-k (ODUk) Optical Channel Data Unit-flex (ODUflex), etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1:N, etc.

In context of the systems and methods described herein, the node 100 includes packet switching and Ethernet ring functionality which can be implemented in circuitry and located on the line blade 102, the control blade 104, in the switching fabric at some point, etc. Similar to the node 100, the node 200 includes packet switching and Ethernet ring functionality through the line modules 220 and/or the switch modules 230. The node 200 includes packet switching and Ethernet ring functionality implemented in circuitry and located on the line modules 220, the switch modules 230, the common equipment 210, etc. Specifically, the node isolation detection process 50 can be implemented in circuitry, logic, hardware, firmware, software, and/or a combination thereof in part in the nodes 100, 200. Those of ordinary skill in the art will recognize the nodes 100, 200 can include other components that are omitted for illustration purposes, and that the systems and methods described herein contemplate using a plurality of different nodes with the nodes 100, 200 presented as an example type of node. For example, in another embodiment, a node may not include the switch modules 230, but rather have the corresponding functionality in the line modules 220 (or some equivalent) in a distributed fashion. In a further embodiment, the node may be an integrated device without a blade, line modules, etc., i.e., a so-called pizza box. For the nodes 100, 200, other architectures providing ingress, egress, and switching are also contemplated for the systems and methods described herein.

In an embodiment, a network element 12 in an Ethernet network 10 includes a plurality of ports 108 having two ports in a first ring and at least one port in a second ring that subtends off the first ring; and a switching fabric interconnecting the plurality of ports, wherein the at least one port operates a first plurality of Operations, Administration, and Maintenance (OAM) sessions with each node in the second ring in a first direction around the second ring, wherein a second plurality of OAM sessions is operated with each node in the second ring in an opposite direction around the second ring from the first direction, and wherein faults and node isolation are correlated and detected based on the first plurality of OAM sessions and the second plurality of OAM sessions.

Network Management System

Figure 8:
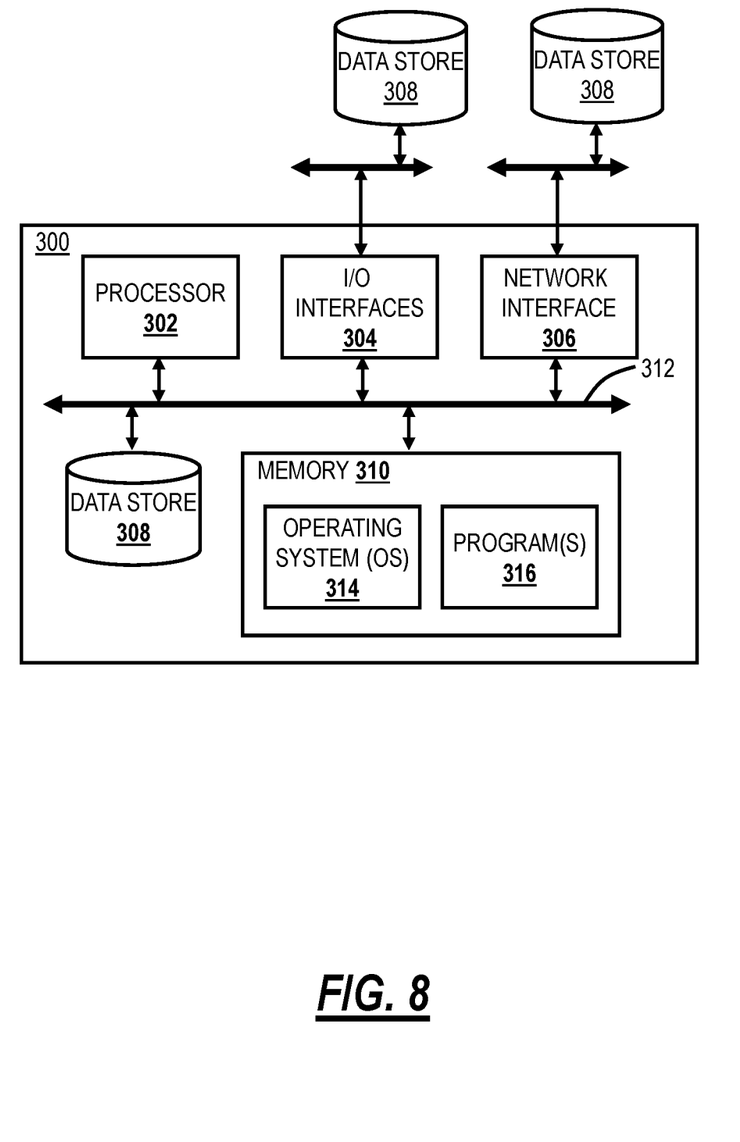

FIG. 8 is a block diagram of a server 300 which may be used for a Network Management System (NMS) or the like. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 8 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touchpad, and/or a mouse.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

In an embodiment, a network management system 300 includes a network interface 306 communicatively coupled to one or more network elements in an Ethernet network having a first ring and a second ring that subtends off one or more hub nodes on the first ring; a processor 302; and memory 310 storing instructions that, when executed, cause the processor to obtain data, via the network interface, from the one or more hub nodes related to a first plurality of Operations, Administration, and Maintenance (OAM) sessions that operate from the one or more hub nodes to each node in the second ring in a first direction around the second ring, obtain data, via the network interface, from the one or more hub nodes related to a first plurality of OAM sessions that operate from the one or more hub nodes to each node in the second ring in a second direction around the second ring, and correlate and detect faults and node isolation in the second ring based on the first plurality of OAM sessions and the second plurality of OAM sessions.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element in an Ethernet network comprising:
a plurality of ports having two ports in a first ring and at least one port in a second ring that subtends off the first ring; and
a switching fabric interconnecting the plurality of ports,
wherein the at least one port in the second ring is configured to operate a first plurality of Operations, Administration, and Maintenance (OAM) sessions with each node in the second ring in a first direction around the second ring,
wherein a second plurality of OAM sessions are configured with each node in the second ring in an opposite direction around the second ring from the first direction, wherein the second plurality of OAM sessions are implemented via one of a second port of the at least one port in the second ring and a port on a second network element in the first ring and the second ring, and
wherein faults and node isolation are correlated and detected based on the first plurality of OAM sessions and the second plurality of OAM sessions.

2. The network element of claim 1, wherein the network element is in a single-homed configuration with the at least one port including a first port and a second port that both connect to the second ring, wherein the first port is configured to operate the first plurality of OAM sessions and the second port is configured to operate the second plurality of OAM sessions.

3. The network element of claim 1, wherein the network element is in a dual-homed configuration with the at least one port including a first port that operates the first plurality of OAM sessions, and wherein the second network element is also in the dual-homed configuration connected to the network element over the first ring and the second network element is configured to operate the second plurality of OAM sessions.

4. The network element of claim 3, wherein a communication protocol is implemented between the network element and the second network element over the first ring for the faults and node isolation.

5. The network element of claim 4, wherein the communication protocol includes event notifications with an identifier for the second ring and information related to the node isolation.

6. The network element of claim 1, wherein the faults and node isolation are correlated and detected, for more than one fault in the second ring, through
a determination of a number of nodes in the second ring that are isolated; and
a determination of which nodes in the second ring are isolated.

7. The network element of claim 6, wherein the number of nodes in the second ring that are isolated equals a total number of nodes in the second ring minus a total number of the first plurality of OAM sessions and the second plurality of OAM sessions that remain operational.

8. The network element of claim 1, wherein the faults and node isolation are correlated and detected, for one fault in the second ring, through
a determination of a location of the fault based on where each of the first plurality of OAM sessions and the second plurality of OAM sessions stop.

9. The network element of claim 1, wherein the first plurality of OAM sessions and the second plurality of OAM sessions utilize one of Continuity Check Messages (CCMs) and Bidirectional Forwarding Detection (BFD) messages.

10. A method of node isolation detection in one or more hub nodes in an Ethernet network having a first ring and a second ring that subtends off the one or more hub nodes on the first ring, the method comprising:
operating a first plurality of Operations, Administration, and Maintenance (OAM) sessions, in the one or more hub nodes, with each node in the second ring in a first direction around the second ring;
operating a second plurality of OAM sessions, in the one or more hub nodes, with each node in the second ring in a second direction around the second ring; and
correlating and detecting faults and node isolation in the second ring based on the first plurality of OAM sessions and the second plurality of OAM sessions.

11. The method of claim 10, wherein the correlating and detecting includes, for more than one fault in the second ring,
determining a number of nodes in the second ring that are isolated; and
determining which nodes in the second ring are isolated.

12. The method of claim 11, wherein the number of nodes in the second ring that are isolated equals a total number of nodes in the second ring minus a total number of the first plurality of OAM sessions and the second plurality of OAM sessions that remain operational.

13. The method of claim 10, wherein the correlating and detecting includes, for one fault in the second ring,
determining a location of the fault based on where each of the first plurality of OAM sessions and the second plurality of OAM sessions stop.

14. The method of claim 10, wherein the one or more hub nodes on the first ring are two hub nodes, and further comprising
implementing a communication protocol between the two hub nodes over the first ring for the correlating and detecting faults and node isolation.

15. The method of claim 14, wherein the communication protocol includes event notifications with an identifier for the second ring and information related to the node isolation.

16. The method of claim 10, wherein the first plurality of OAM sessions and the second plurality of OAM sessions utilize one of Continuity Check Messages (CCMs) and Bidirectional Forwarding Detection (BFD) messages.

17. A network management system comprising:
a network interface communicatively coupled to one or more network elements in an Ethernet network having a first ring and a second ring that subtends off one or more hub nodes on the first ring;
a processor; and
memory storing instructions that, when executed, cause the processor to
obtain data, via the network interface, from the one or more hub nodes operating a first plurality of Operations, Administration, and Maintenance (OAM) sessions in a first direction around the second ring,
obtain data, via the network interface, from the one or more hub nodes operating a second plurality of OAM sessions in a second direction around the second ring, and
correlate and detect faults and node isolation in the second ring based on the data from each of the first plurality of OAM sessions and the second plurality of OAM sessions.

18. The network management system of claim 17, wherein the memory storing instructions that, when executed, further cause the processor to, for more than one fault in the second ring, determine a number of nodes in the second ring that are isolated; and determine which nodes in the second ring are isolated.

19. The network management system of claim 18, wherein the number of nodes in the second ring that are isolated equals a total number of nodes in the second ring minus a total number of the first plurality of OAM sessions and the second plurality of OAM sessions that remain operational.

20. The network management system of claim 17, wherein the memory storing instructions that, when executed, further cause the processor to, for one fault in the second ring, determine a location of the fault based on where each of the first plurality of OAM sessions and the second plurality of OAM sessions stop.

* * * * *